US012803684B2

(12) United States Patent
Pirker et al.

(10) Patent No.: US 12,803,684 B2
(45) Date of Patent: Nov. 17, 2026

(54) ACCESS-PROTECTED FUNCTION IN A RADIO CIRCUIT DEVICE

(71) Applicant: Infineon Technologies AG, Neubiberg (DE)

(72) Inventors: Dominic Peter Pirker, Graz (AT); Mathias Gangl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 73 days.

(21) Appl. No.: 18/895,829

(22) Filed: Sep. 25, 2024

(65) Prior Publication Data

US 2025/0105927 A1 Mar. 27, 2025

(30) Foreign Application Priority Data

Sep. 25, 2023 (DE) ......................... 102023209329.4

(51) Int. Cl.
*H04B 17/14* (2015.01)
*H04B 17/21* (2015.01)
*H04B 17/24* (2015.01)

(52) U.S. Cl.
CPC ............. *H04B 17/14* (2015.01); *H04B 17/21* (2015.01); *H04B 17/24* (2015.01)

(58) Field of Classification Search
CPC ......... H04B 17/14; H04B 17/21; H04B 17/24
See application file for complete search history.

(56) References Cited

U.S. PATENT DOCUMENTS

| | | | | |
|---|---|---|---|---|
| 7,504,991 B2 * | 3/2009 | Li | G01S 13/106 342/134 |
| 10,762,411 B1 * | 9/2020 | Parshin | G06K 19/07773 |
| 11,635,312 B2 * | 4/2023 | Fox | G01D 18/002 73/31.05 |
| 2021/0018595 A1 | 1/2021 | McFadden | |
| 2022/0244367 A1 | 8/2022 | Shin et al. | |
| 2022/0322085 A1 * | 10/2022 | De Vegt | G07C 9/00309 |

FOREIGN PATENT DOCUMENTS

| | | |
|---|---|---|
| DE | 102020201150 A1 | 8/2021 |
| DE | 102020117377 A1 | 1/2022 |
| DE | 102020126539 A1 | 4/2022 |
| EP | 2138861 B1 | 9/2016 |
| EP | 4027117 A2 | 7/2022 |

OTHER PUBLICATIONS

Aug. 14, 2024 (DE) Office Action—App. 102023209329.4.

* cited by examiner

*Primary Examiner* — Seung H Lee
(74) *Attorney, Agent, or Firm* — Banner & Witcoff, Ltd.

(57) ABSTRACT

A radio circuit device including a processor, a radio circuit, and a memory protected using a cryptographic function. The processor is configured to carry out a calibration of a distance determination for strongly blocked lines of sight between two UWB communication circuits of the radio circuit by determining calibration parameters using the radio circuit, and storing the calibration parameters in the memory.

18 Claims, 9 Drawing Sheets

ACCESS-PROTECTED FUNCTION IN A RADIO CIRCUIT DEVICE

TECHNICAL FIELD

The disclosure relates to a radio circuit device, a device for providing an access-protected function, a method for calibrating a radio circuit device, and a method for providing an access-protected function.

BACKGROUND

Ultra-wideband technology (UWB) is a type of short-range radio communication that uses extremely large frequency ranges having a bandwidth of at least 500 MHz or of at least 20% of the arithmetic mean of the lower and upper cutoff frequencies of the frequency band used.

UWB is increasingly used in particular for data-protected distance determination, which offers advantages for many applications.

An example application is a smart lock, which regulates access to a residential building or other building, for example. Similarly, physical access to a safe could be regulated.

In particular in cases where a direct line of sight between two UWB communication partners is strongly blocked, for example by a safe with a UWB transmitter/receiver inside, or, for example, a strongly shielding (e.g. metal) door, a distance between the two UWB communication partners determined by means of UWB can differ from an actual distance between the two communication partners, although the (incorrect) distance determined is reliable and stable. This reliability is ensured by the constant position of one of the two UWB communication partners whose direct line of sight is blocked.

FIG. 1A illustrates such a scenario in which a direct line of sight between the two communication partners 100 and 101 is blocked by a wall 110, which weakens the UWB radio signal emitted by a UWB transmitter 101 (illustrated as arrows, which are narrower after passage through the wall 110).

In this case, for example, the UWB signal emitted by the transmitter 101 and received by the receiver 100 after passing through the wall can be attenuated to such an extent that it is overwhelmed by noise (not shown) and is not detected (therefore in FIG. 1B, which illustrates the signal strength received at the receiver 100 as a function of time, it is shown crossed out).

Instead, the signal represented as a white dotted arrow is used as the signal with the supposedly shortest time interval.

If the spatial distance is determined from the corresponding time interval, this does not correspond to the direct path between the two communication partners 100, 101, but to the (much longer) path, which is illustrated by the white arrow with black dots.

In the case of an attenuated or blocked direct line of sight, a distance measured between two communication partners by means of UWB can therefore be consistently too high.

The incorrect readings can adversely affect the correct functioning of the system and/or user satisfaction. This is because the distance between a UWB receiver and a UWB transmitter can be used as a parameter for providing or denying safety-relevant functions.

For example, a safe designed to be opened contactlessly can be set to open if the distance between the UWB receiver and the UWB transmitter falls below a minimum distance (e.g. one meter).

In view of the measurement error, it may be necessary to specify a value other than a set threshold value (e.g. of one meter) as the minimum distance (e.g. one and a half meters), wherein the value would have to be determined by a series of tests to be performed by the user, which is not only error-prone and inaccurate, but also inconvenient.

One way to avoid this problem would be to place the UWB receiver at the user end outside the protected area, for example outside the safe, rather than in a protected area. However, this would increase the risk of attacks.

Another prior-art solution could be provided in the form of an error correction of the measured distance performed by the host controller with default settings. However, this would also increase the risk of attacks.

SUMMARY

In various exemplary aspects, a radio-circuit (e.g. UWB) distance calibration procedure is provided, in particular for configurations in which a direct line of sight between a radio circuit device and a radio transmitter (as the communication partner) is strongly blocked. The distance calibration procedure can be carried out during commissioning of the radio circuit device (e.g. a smart lock).

Immediately after the commissioning of the radio circuit device, according to various exemplary aspects, a pairing with a radio transmitter (e.g. a smartphone) can first be carried out in order to grant the radio transmitter the authorization to perform an access-protected function.

According to various exemplary aspects the calibration procedure can be carried out directly after the pairing. Results of the calibration procedure can be stored reliably and securely, and execution of the procedure can be restricted to predefined users (e.g., users of the previously paired device), which can be achieved by requiring user authentication to perform the calibration procedure.

In various exemplary aspects, a radio circuit device is provided. The radio circuit device comprises a processor, a radio circuit and a memory protected by means of a cryptographic function, wherein the processor is configured to carry out a calibration of a distance determination of the radio circuit, comprising determination of calibration parameters by means of the radio circuit, and to store the calibration parameters in the protected memory.

BRIEF DESCRIPTION OF THE DRAWINGS

Exemplary aspects of the disclosure are shown in the drawings and will be explained in more detail in the following.

In the figures.

DETAILED DESCRIPTION

Figure 1A:
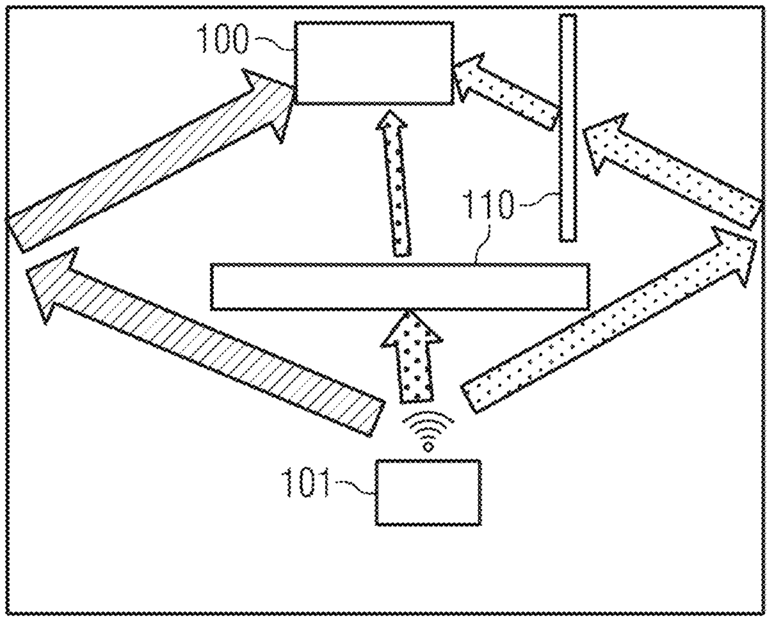
FIG. 1A shows an illustration of a scenario in which a direct line of sight between two radio communication partners, namely a radio circuit device and a radio transmitter, is blocked.
Figure 1B:
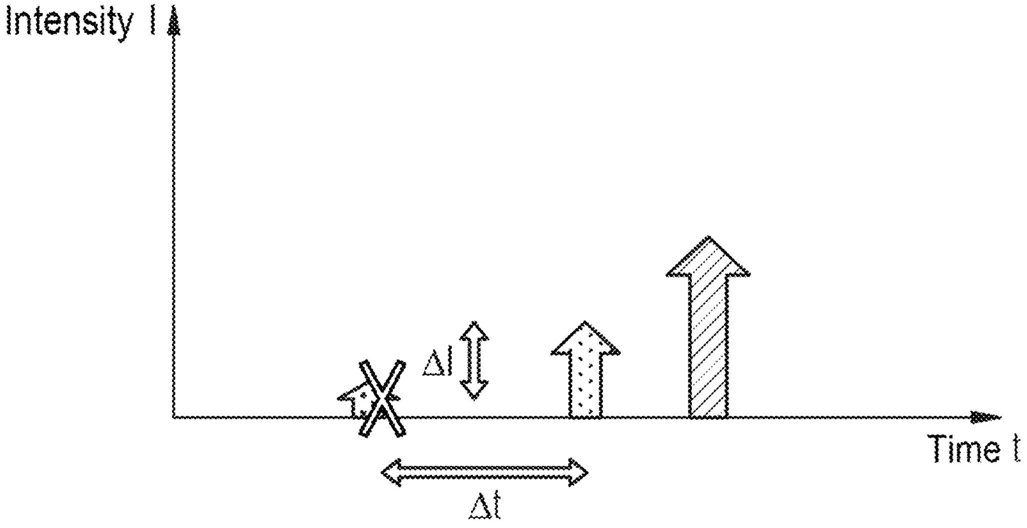
FIG. 1B shows a schematic representation of signals that can occur during radio communication according to FIG. 1A.

In the detailed description that follows, reference is made to the accompanying drawings, which form part of said description and show, for illustration, specific aspects in which the aspects of the disclosure can be performed. In this regard, direction terminology such as, for instance, "at the top", "at the bottom", "at the front", "at the back", "front", "rear", etc. is used with respect to the orientation of the figure(s) described. Since components of aspects can be positioned in a number of different orientations, the directional terminology is used for illustration and is not restrictive in any way. It goes without saying that other aspects can be used and structural or logical changes can be made, without departing from the scope of protection of the present disclosure. It goes without saying that the features of the various illustrative aspects described herein can be combined with one another, unless specifically stated otherwise. The detailed description that follows should therefore not be interpreted in a restrictive sense, and the scope of protection of the aspects of the disclosure is defined by the attached claims.

Within the scope of this description, the terms "connected" and "coupled" are used to describe both a direct and an indirect connection and direct or indirect coupling. In the figures, identical or similar elements are provided with identical reference signs if expedient.

A method for calibrating a radio circuit device is provided according to various exemplary aspects.

The calibration can be initiated after coupling of the radio circuit device to a (e.g. external) radio transmitter, which is provided for controlling at least one function of the radio circuit device.

The pairing can be associated with an authentication of the user. In other words, the radio circuit device may be configured to allow pairing with the radio transmitter only when the user of the radio transmitter authenticates him/herself on the radio circuit device.

The calibration can be used to provide the radio circuit device with correction values as calibration parameters in order to correct erroneous distance readings.

In a constant/stationary environment, the correction values can be constant or substantially constant for the same true distance between the radio circuit device and the radio transmitter.

Calibration may include the user providing a true distance between the radio circuit device and the radio transmitter after pairing with the radio circuit device.

The radio circuit device can then determine a distance to the radio transmitter in a substantially known manner. Typically, for distance measurement using radio transmission (e.g. via UWB), both communication partners exchange parameters relevant for distance determination, e.g. a session key, channel numbers, local address, etc., prior to the measurement. The parameter exchange can typically take place either within the established communication path (which is also known as "in-band"), and/or via an additional communication path, for example via Bluetooth Low Energy (BLE), WLAN or similar. The additional communication path is also called "out-of-band" (OOB).

If the result of the distance measurement is outside a tolerance range for random measurement errors, the radio circuit device can determine the correction value from the difference between the true distance values and the measured distance, which allows the measured distance to be corrected to obtain the true distance.

The calibration can be performed in different exemplary aspects for multiple true distances.

This allows an accuracy of the distance measurement to be increased, which may be particularly relevant for regions that lie in a transition region between enabling/granting an (e.g. safety-relevant) function and denying the function, e.g. between opening a smart lock and closing/leaving locked.

Figure 2A:
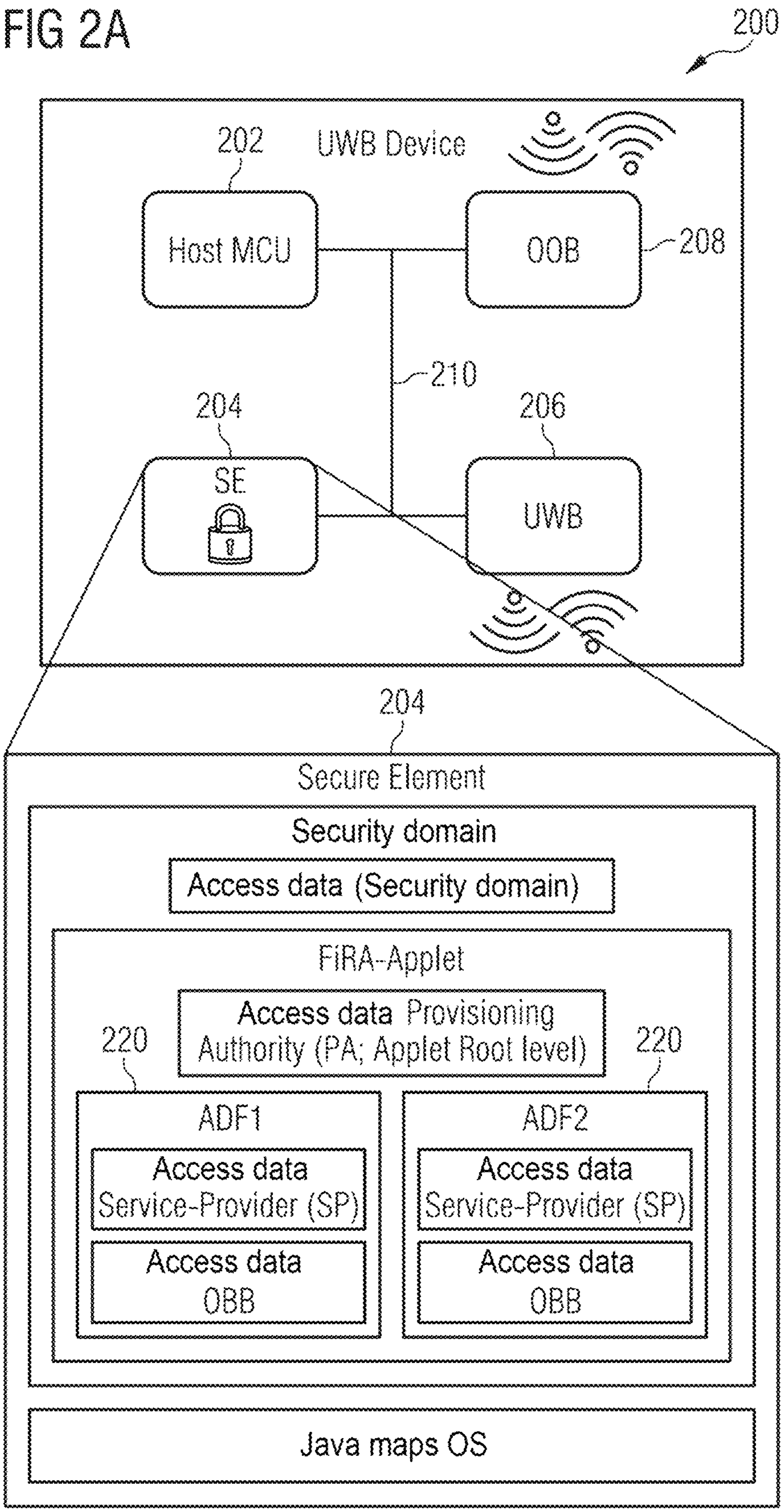
FIG. 2A shows a schematic illustration of a radio circuit device as according to various exemplary aspects.

FIG. 2A shows a schematic representation of a radio circuit device 200 according to various exemplary aspects with a detailed representation of a memory 204 protected by means of a cryptographic function, which is also called a secure element (SE) or a security element and which is part of the radio circuit device 200.

Figure 2B:
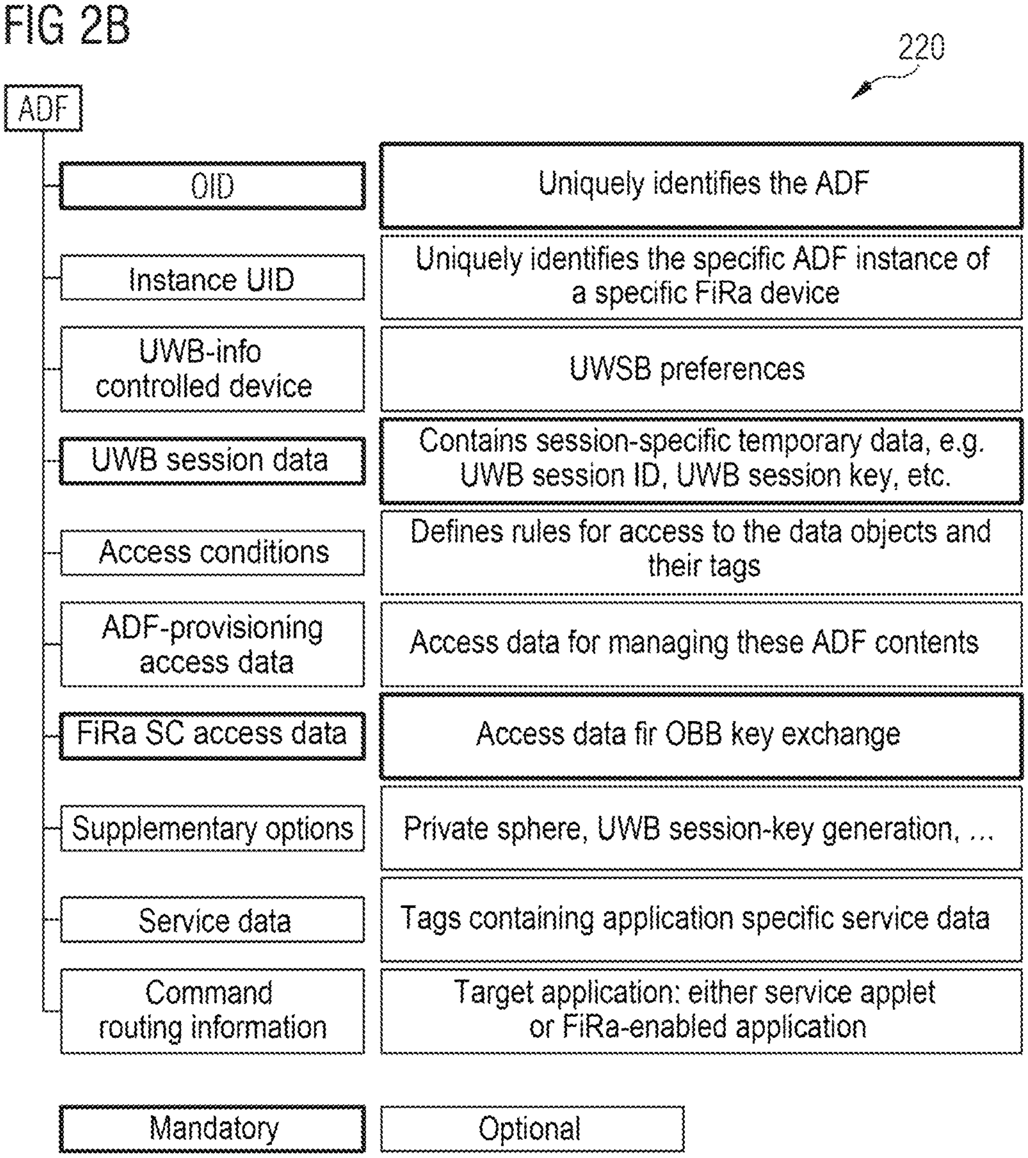
FIG. 2B shows a schematic representation providing details of the file structure of a secure element of the radio circuit device from FIG. 2A.

The protected memory 204, in turn, has application-related files 220 (ADF, for "application-dedicated file"), which are schematically illustrated and elaborated in FIG. 2B.

The radio circuit device 200 comprises a processor 202, a radio circuit 206 and the memory 204 protected by means of the cryptographic function.

The processor 202 can be formed as a microcontroller, for example, and/or comprise any common hardware, software or combination of hardware and software which is suitable for carrying out an (e.g. higher-level) control of the radio circuit 206, the memory 204 and optionally additional components of the radio circuit device 200.

The radio circuit 206 can be a UWB circuit or comprise such a circuit. The radio circuit 206 can be configured, for example, for communication by means of radio signals in a frequency range between approximately 3.5 GHz and approximately 10 GHZ.

Individual components of the radio circuit device 200 can be connected to each other by means of serial interfaces or buses (by way of example, SPI and $I^2C$ are shown in FIGS. 3A to 3D) and/or, for example, by means of parallel interfaces or buses.

Communication with the radio circuit 206 can take place according to a standard for this type of radio circuit. For example, in the case of a UWB radio circuit the communication may take place be in accordance with the FiRa™ Secure UWB Service (SUS) standard or CCC, to facilitate interoperability between devices.

Since communication partly takes place directly between the memory 204 and the radio circuit 206, the memory 204 can be configured for communication according to the standard, for example, by the memory 204 having a FiRa applet, which manages access data, for example.

The following table lists which data can be transferred when a distance determination data set is transferred in accordance with the FiRa standard:

Ranging Data Set (RDS) for SUS internal API

| Tag | Length | DESCRIPTION | M/O |
|---|---|---|---|
| 0xC0 | 16 or 32 | UWB session key | M |
| 0xC1 | 16 or 32 | Responder-specific | O |

-continued

| Ranging Data Set (RDS) for SUS internal API | | | |
|---|---|---|---|
| Tag | Length | DESCRIPTION | M/O |
| | | sub-session key | |
| 0xC2 | 2 | distance | O |
| 0xC3 | 2 | Angle of Arrival (AoA) | O |
| 0xC4 | 1-128 | Customer-specific data | O |
| 0xC5 | var. | reserved | O |
| 0xC6 | var. | Key exchange key identification | O |
| 0xC7 | var. | reserved | O |
| 0xC8-CD | var. | RFU | O |
| 0xCE | 5-16 | Service applet AID | O |
| 0xCF | 4 | UWB Session ID | M |
| 0xD0 | N/A | reserved | N/A |
| 0xD1 | N/A | reserved | N/A |
| 0xF0-F7 | N/A | Reserved for own use | O |

Where M stands for mandatory, O for optional.

In particular, the last tags 0xF0-F7 of the list, which can be optionally provided and is intended for own use, can be used to transfer the calibration data in a standard-conformant manner.

FIGS. 2A (the enlarged, more detailed representation of the memory 204) and 2B describe in detail which types of data are fed to the memory 204 and can also be retrieved from it.

The access data listed in FIG. 2A for the memory 204 (the SE) can be used, for example, as follows:

For example, the "security domain access data" may include keys/certificates for establishing a secure channel to the security domain.

The secure channel can be used to install/update/personalize/delete applets in the security domain.

For example, the "Access Data Provisioning Authority (PA; applet root level)" may include (unique) certificates and associated private keys, and/or access data for the provisioning authority (PA), such as a set of root CA certificates.

The Provisioning Authority may have permission to create and/or delete ADFs (application dedicated files).

For example, the "Access Data Service Provider (SP)" may contain credentials of the SPs that have permission to manage the content of a specific ADF. Secure channels with symmetric and asymmetric access data are permitted for this purpose (e.g. FiRa SC1 or SCP11c).

For example, the "Access Data OOB" can represent access data to the secure channel (SC) of the OOB communication provided by the SP of the ADF.

Although it can be advantageous from a security point of view to form the radio circuit device 200 as an integral device, a design in the form of assembled individual components may also have advantages, for example with regard to manufacturing costs and/or maintenance.

In various exemplary aspects, the processor 202 may be configured to carry out a calibration of a distance determination of the radio circuit 206.

In other words, the radio circuit 206 may be configured to perform a distance determination. In UWB circuits, this is one of the standard functions that make UWB technology particularly attractive for various applications. However, the radio circuit 206 may optionally also have a different type of radio technology, which is configured for distance determination.

The processor 202 can initiate a calibration for the distance determination to be performed by the radio circuit.

The calibration may include determination of calibration parameters by means of the radio circuit 206.

The calibration process is explained in more detail below, in particular with reference to FIG. 3A to FIG. 3D.

The processor 202 may also be configured for storing the calibration parameters (or, optionally, causing them to be stored) in the memory 204.

Since the memory 204 is a cryptographically protected memory, this means that the determined calibration parameters are stored in the radio circuit device 200 protected against unauthorized access and are provided only at the request of authorized entities (users, devices, processes).

FIGS. 3A to 3D illustrate examples of a calibration process of a radio circuit device 200 according to various exemplary aspects as a sequence of individual operations numbered in the figures.

The processor can be configured to initiate the carrying out of the calibration by a user.

Figure 3A:
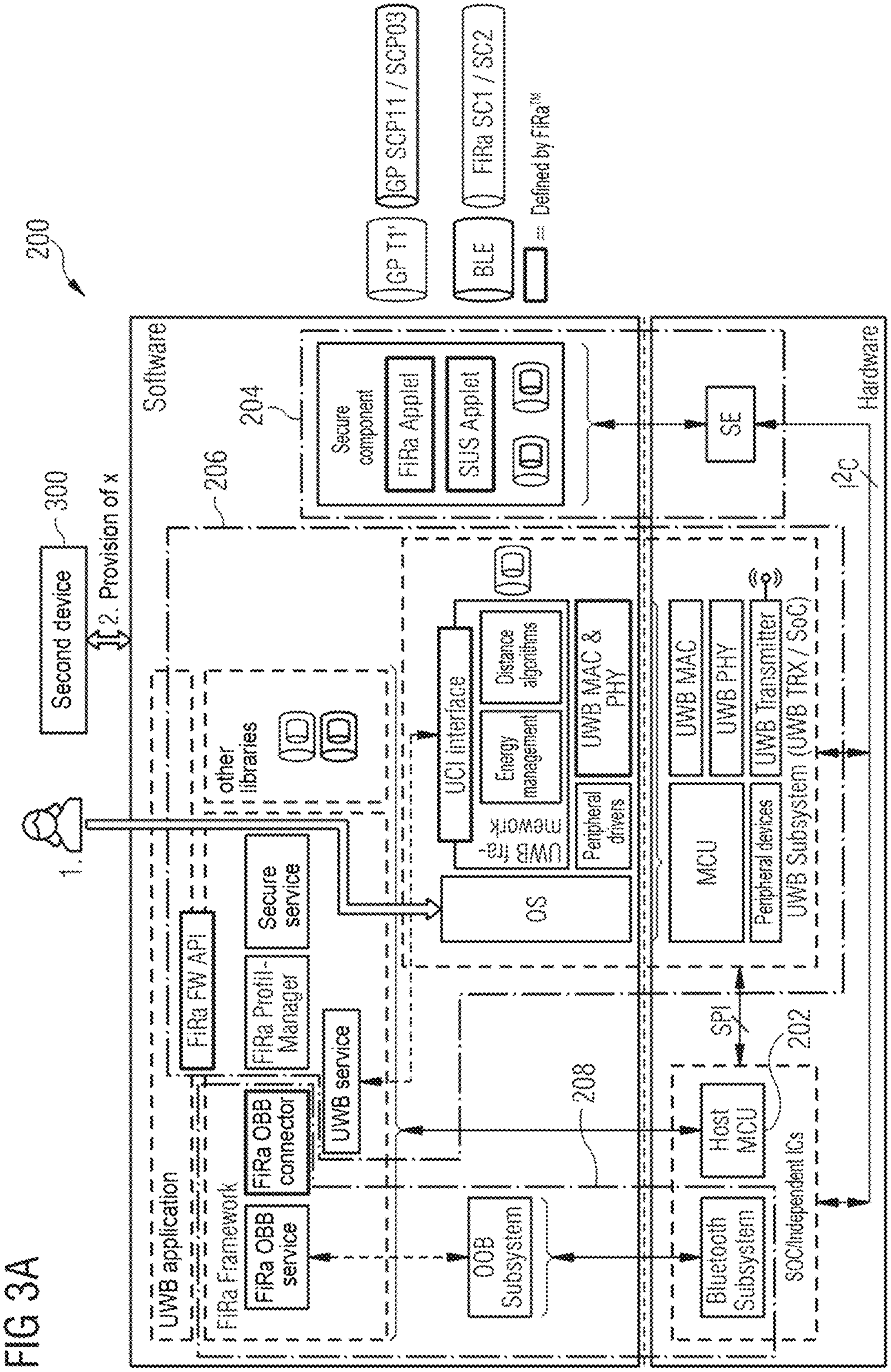
FIGS. 3A to 3D show an illustration of a calibration procedure of a radio circuit device according to various exemplary aspects.

This is described in more detail in FIG. 3A under label 1, and the associated path. Initiating the carrying out of the calibration may include, for example, an authentication of the user on the radio circuit device 200.

The authentication can be carried out, for example, directly on the radio circuit device 200, for example by means of a key entry and/or a biometric authentication. Alternatively or additionally, the authentication can be carried out from outside the radio circuit device 200, for example by means of a radio transmitter 300.

The radio transmitter 300 may be configured to communicate using the same radio technology as the radio circuit device 200, thus also as a UWB transmitter (transmitter and receiver), for example.

For example, the initiating can optionally include a command to perform the calibration. The command can also be input directly on the radio circuit device 200 or transmitted from outside, for example by means of the radio transmitter 300, to the radio circuit device 200.

The input of commands, transmission of authentication data and/or a parameter exchange can optionally take place via an additional communication path (i.e. in addition to the radio communication, e.g. in addition to UWB), for example by means of Bluetooth Low Energy (BLE), WLAN or similar. The additional communication path is also called "out-of-band" (OOB).

Part of the determination of calibration parameters can include receiving a true distance value x (see FIG. 3A under 2.), representing a true distance x between the radio circuit device 200 and the external radio transmitter 300. The true distance x can be determined by the user (e.g. measured by means of a length gauge) and provided. The true distance x (which can also be called the real distance or actual distance, to distinguish it from a possibly incorrect distance y calculated by the radio circuit). In other words, the "true distance x" refers to the distance that a user would determine as the distance using common length measuring devices.

In various exemplary aspects, providing the true distance value may additionally include the function of initiating the calibration.

Figure 3B:
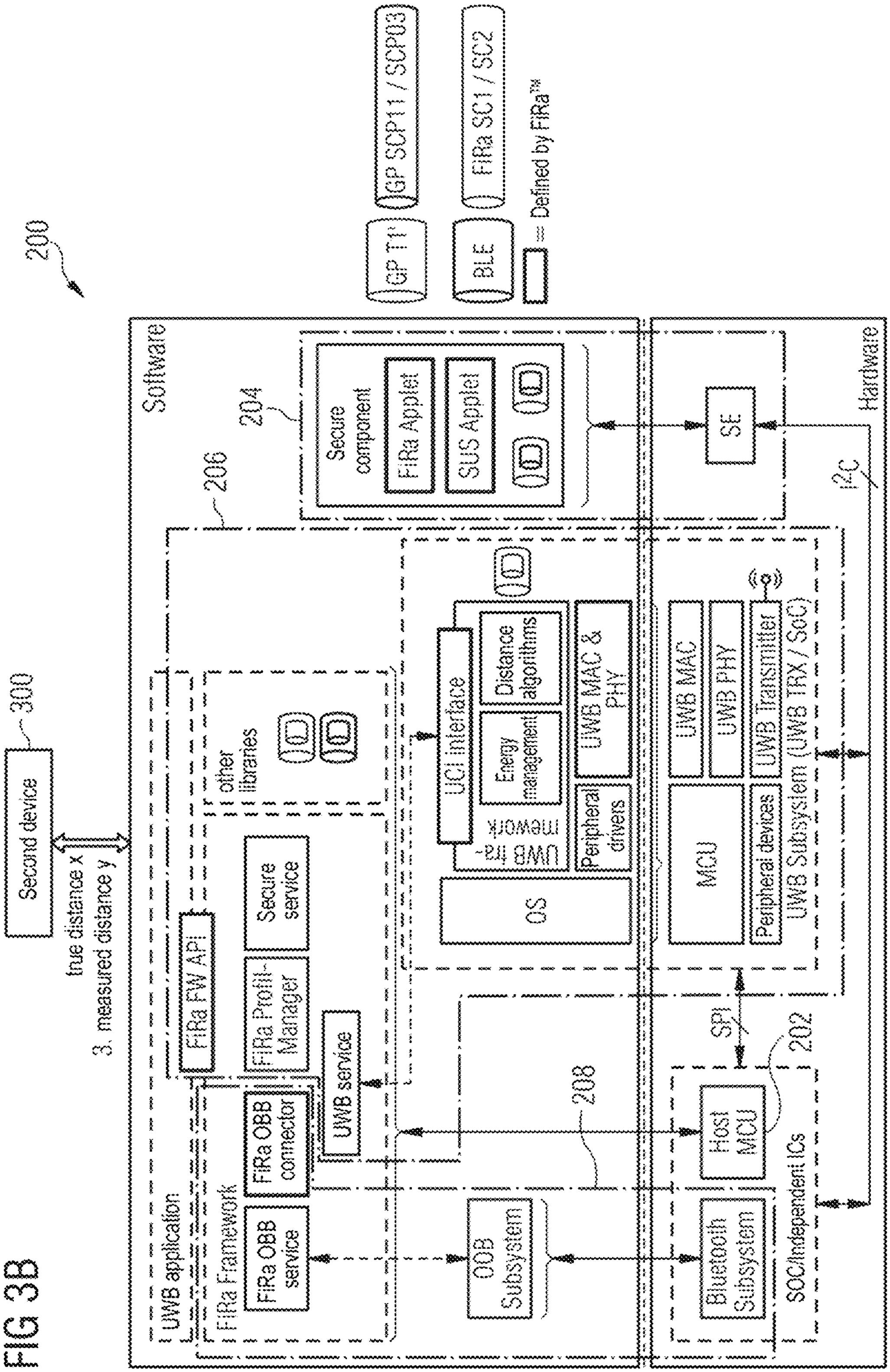

After providing the true distance value x, the radio circuit 206 can determine the distance between the radio circuit device 200 and the radio transmitter 300 using radio signals sent and received by means of the radio circuit 206, and provide the distance as a measured distance value y. This is illustrated in FIG. 3B under 3.

Then, the radio circuit 206 can form a difference between the true distance value x and the measured distance value y, which forms a calibration parameter.

This means that in the case of a subsequent distance measurement carried out by the radio circuit 206, e.g. in normal operation, the systematically incorrect distance value y can be corrected to the true distance value x by applying the calibration parameter (the difference between the true distance value x and the measured distance value y), i.e. calculated with the correct sign (the magnitude of the difference must be subtracted from the measured distance value y in order to obtain the true distance value x).

Figure 3C:
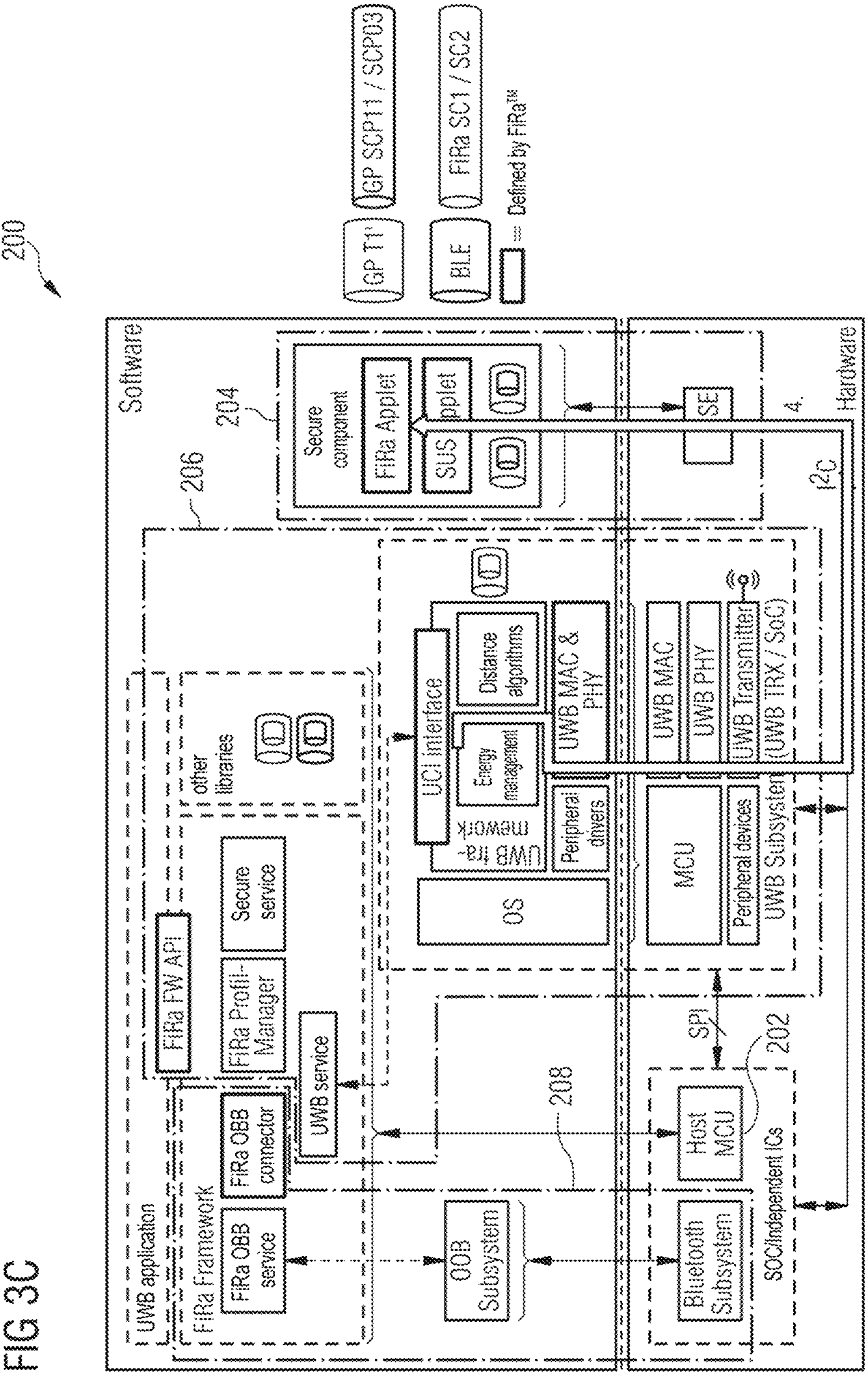

The calibration parameter or parameters can be stored in the memory 204 in various exemplary aspects. An example of this is illustrated in FIG. 3C under 4.

As already indicated above, the processor 202 is furthermore configured to initiate a distance determination of the radio circuit 206 as part of the normal operation, after the calibration.

In this case, the radio circuit 206 is configured to determine a measured distance value y between the radio circuit device 200 and the external radio transmitter 300 using radio signals sent and received by means of the radio circuit 206, and to correct the measured distance value y by means of the determined calibration parameters.

The radio circuit 206 may be configured to receive the calibration parameters from the protected memory 204, for example, even before the start of the distance measurement or at least before a correction of the measured distance value y.

Figure 3D:
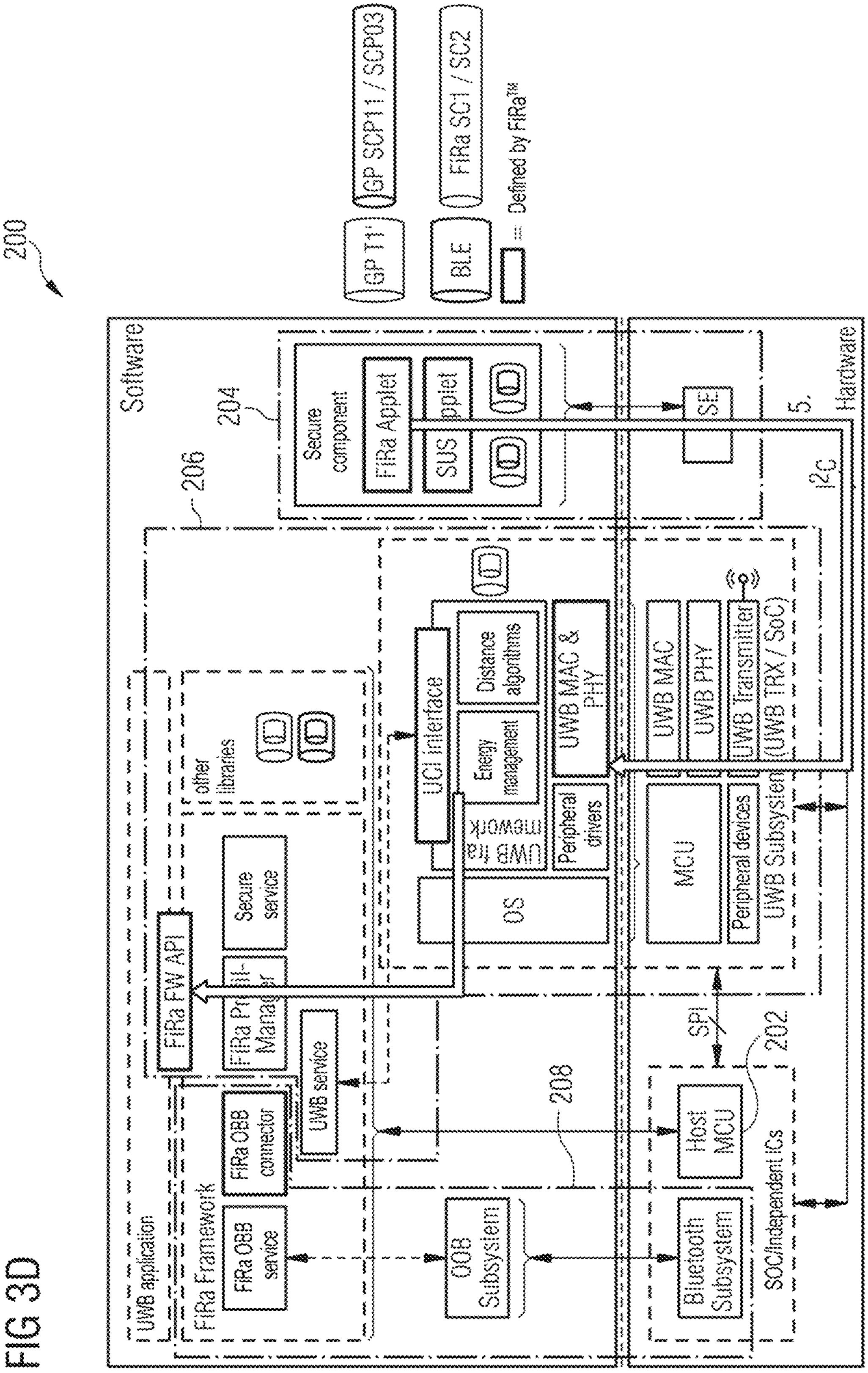

This is illustrated in FIG. 3D at section 5. For reading out the calibration parameters from the protected memory 204, authentication may be required, for example, of the user and/or the radio circuit 206.

The distance value corrected by means of the calibration parameters can be transferred to an application which has requested the distance determination, for example, to an application which monitors data access or physical access, e.g. a door opening system or similar, and can be integrated in the radio transmitter 300 or coupled to it.

This is illustrated in FIG. 3D under 6.

In various exemplary aspects the processor 202 may be furthermore configured to determine (or, optionally, to cause the radio circuit 206 to determine) additional environmental parameters using the radio signals sent and received during calibration and to assign the determined environmental parameters to the measured distance value y.

Figure 4A:
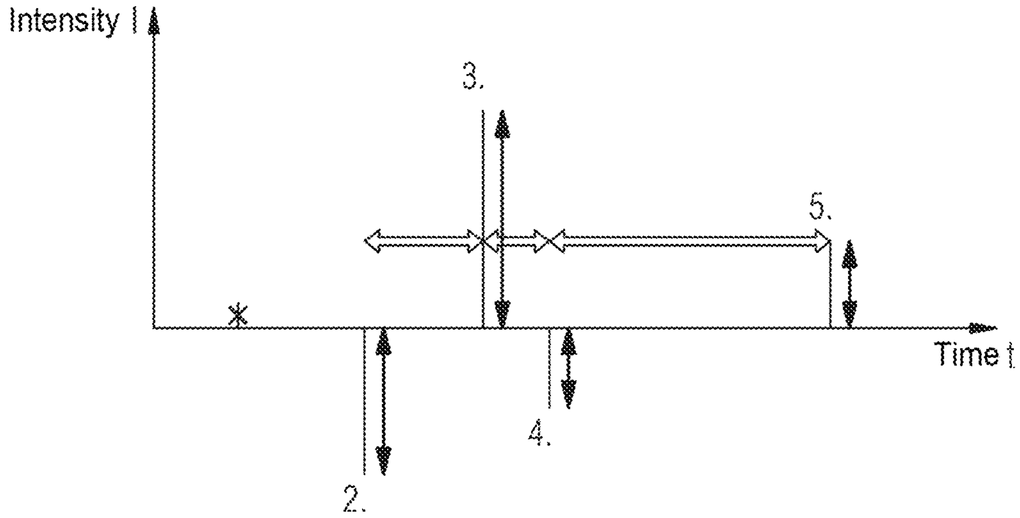
FIG. 4A shows a schematic representation of signals that can occur during radio communication according to various exemplary aspects.
Figure 4B:
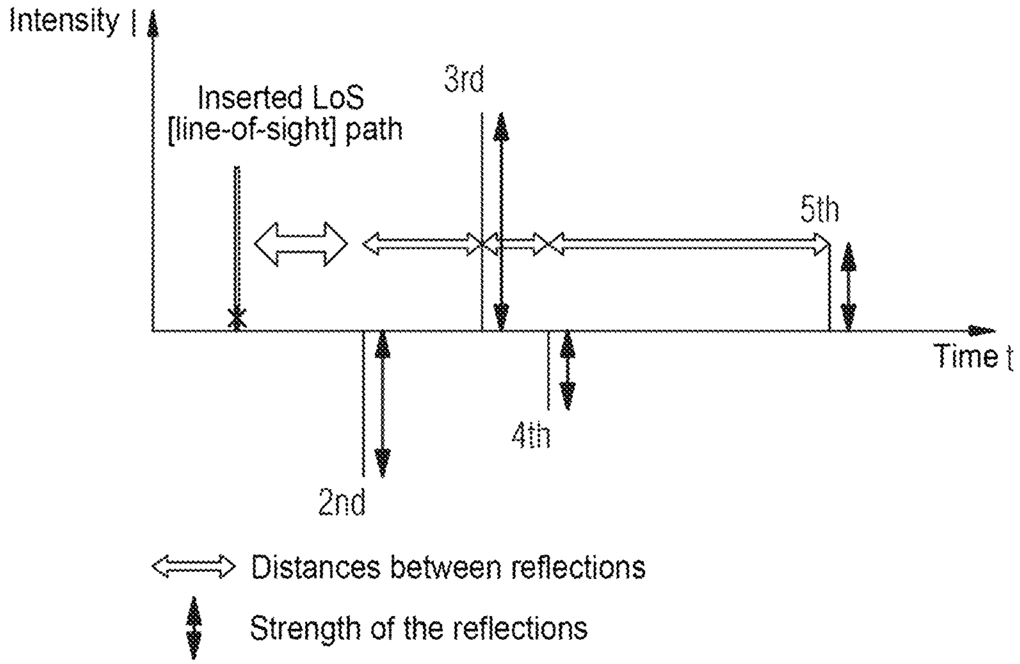
FIG. 4B shows a schematic representation of signals that may occur in radio communication according to various exemplary aspects when a signal of direct line of sight is simulated in an attack.

Examples of what can constitute such additional environmental parameters are illustrated in FIGS. 4A and 4B.

FIG. 4A shows a schematic representation of signals that can occur during radio communication according to various exemplary aspects.

Ultra-short signals emitted by the radio transmitter 300 are received by the radio circuit device 200 at different times and with different intensities.

The pattern of time intervals and relative intensities substantially depends on the environment of the radio circuit device 200 which it affects, where the radio signal is reflected (which affects the arrival time at the radio circuit device 200) and/or how strongly it is attenuated (which affects the intensity) before it is received by the radio circuit device 200.

In a stable environment, the pattern of time intervals and relative intensities is like a fingerprint and can be stored accordingly as (an) additional environmental parameter(s), for example also in the protected memory 204.

FIG. 4B illustrates how an additional signal inserted by an attacker, which is intended to pretend that a signaling device is present within an activation distance, appears in conjunction with the additional environmental parameters.

FIG. 4B shows a schematic representation of signals that may occur in radio communication according to various exemplary aspects when a signal of direct line of sight is simulated in an attack.

The effect of the additional signal is that, as a result of the newly added distance (shown with the wide arrow), the sequence of the determined distances (as well as the intensities) differs from the sequences of distances and intensities stored as additional environmental parameters.

This enables an attack by means of an added signal to be identified as such and, optionally, to provide an alarm, but at least to deny the requested approval (e.g. data access/physical access).

In various exemplary aspects the processor 202 can be furthermore configured to allow the correction of the measured distance value y only if the additional environmental parameters determined during the distance determination in normal operation correspond to those additional environmental parameters which were determined during the calibration as environmental parameters for the same measured distance value y.

The fact that the radio circuit 206 performs the correction to a distance determination can have at least two advantages:

Firstly, the application installed on the host does not obtain access to the uncorrected results, minimizing the risk that a calibration (for example, within the host) will be exploited for an attack.

And secondly, the host application can rely on the fact that standardized procedures have been used to generate the received and transmitted values. If the correction were to be performed in the host application, that could mean that the results obtained are no longer FiRa-certified.

Figure 5:
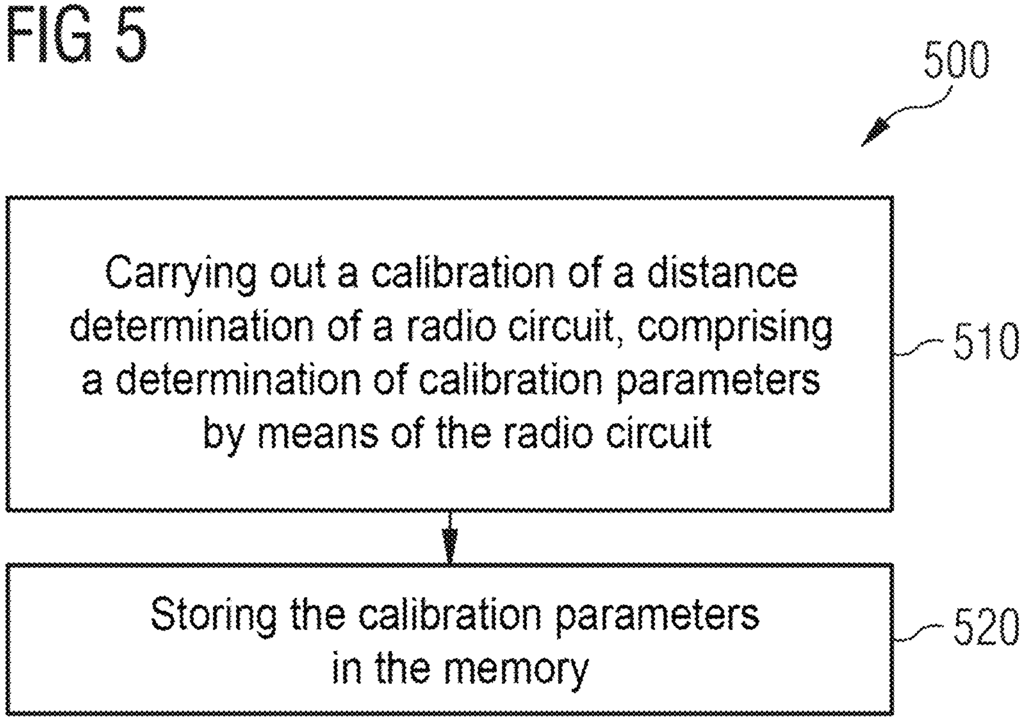
FIG. 5 shows a flowchart of a method for calibrating a radio circuit device according to various exemplary aspects.

FIG. 5 shows a flowchart 500 of a method for calibrating a radio circuit device comprising a radio circuit and a cryptographically protected memory.

The method comprises carrying out a calibration of a distance determination of the radio circuit, comprising a determination of calibration parameters by means of the radio circuit (510) and storing the calibration parameters in the memory (520).

Some exemplary aspects are specified in summary below.

Exemplary aspect 1 is a radio circuit device comprising a processor, a radio circuit and a memory protected by means of a cryptographic function, wherein the processor is configured to carry out a calibration of a distance determination of the radio circuit, comprising the determination of calibration parameters by means of the radio circuit, and to store the calibration parameters in the memory.

Exemplary aspect 2 is a radio circuit device according to exemplary aspect 1, wherein the processor is configured to initiate the carrying out of the calibration by a user.

Exemplary aspect 3 is a radio circuit device according to exemplary aspect 2, wherein the initiation of the carrying out of the calibration comprises an authentication of the user on the radio circuit device.

Exemplary aspect 4 is a radio circuit device according to any of the exemplary aspects 1 to 3, wherein the determination of calibration parameters comprises receiving a true distance value representing a true distance between the radio circuit device and an external radio transmitter, determining a measured distance value between the radio circuit device and the radio transmitter using radio signals sent and received by means of the radio circuit, and determining a difference between the true distance value and the measured distance value as a calibration parameter.

Exemplary aspect 5 is a radio circuit device according to exemplary aspect 4, wherein the processor is furthermore configured to initiate a distance determination of the radio circuit as part of the normal operation after the calibration, wherein the radio circuit is configured to determine a measured distance value between the radio circuit device and the external radio transmitter using radio signals sent and received by means of the radio circuit and to correct the measured distance value by means of the determined calibration parameters.

Exemplary aspect 6 is a radio circuit device according to exemplary aspect 5, wherein the radio circuit is configured to receive the calibration parameters from the protected memory.

Exemplary aspect 7 is a radio circuit device according to any of the exemplary aspects 4 to 6, wherein the processor is furthermore configured to determine additional environmental parameters using the radio signals sent and received during calibration and to assign the determined environmental parameters to the measured distance value.

Exemplary aspect 8 is a radio circuit device according to exemplary aspect 7, wherein the processor is furthermore configured to store the determined environmental parameters in the memory.

Exemplary aspect 9 is a radio circuit device according to exemplary aspect 5 or 6 and either of the exemplary aspects 7 or 8, the processor being furthermore configured to allow the correction of the distance value only if the additional environmental parameters determined during the distance determination in normal operation correspond to those additional environmental parameters which were determined during the calibration as environmental parameters for the same measured distance value.

Exemplary aspect 10 is a radio circuit device according to either of the exemplary aspects 2 or 3, wherein the initiation of the calibration by the user includes providing a true distance value by the user.

Exemplary aspect 11 is a radio circuit device according to any of the exemplary aspects 4 to 10, wherein the processor is configured to carry out a plurality of calibrations for a plurality of different true distances.

Exemplary aspect 12 is a radio circuit device according to any of the exemplary aspects 1 to 11, wherein the radio circuit is configured for communication by means of radio signals in a frequency range between approximately 3.5 GHz and approximately 10 GHZ.

Exemplary aspect 13 is a radio circuit device according to any of the exemplary aspects 1 to 12, wherein the radio receiver is configured for ultra-wideband communication (UWB communication).

Exemplary aspect 14 is a radio circuit device according to any of the exemplary aspects 1 to 13, wherein the radio circuit is furthermore configured for another communication in addition to the ultra-wideband communication (UWB communication).

Exemplary aspect 15 is a radio circuit device according to exemplary aspect 14, the radio circuit being furthermore configured for communication according to a standard for UWB radio circuits, optionally according to FiRa Secure UWB Service (SUS) standard.

Exemplary aspect 16 is a device for providing an access-protected function, wherein the device has a radio circuit device according to any of the exemplary aspects 5 to 15, wherein the device is configured to check a request for providing the access-protected function and to deny the access-protected function for as long as no distance determination initiated as part of the normal operation results in a corrected measured distance value that lies within a predefined range of distance values.

Exemplary aspect 17 is a method for calibrating a radio circuit device, which comprises a radio circuit and a cryptographically protected memory, wherein the method comprises carrying out a calibration of a distance determination of the radio circuit, comprising determination of calibration parameters by means of the radio circuit, and storing the calibration parameters in the memory.

Exemplary aspect 18 is a method according to exemplary aspect 17, which further comprises initiating the carrying out of the calibration by a user.

Exemplary aspect 19 is a method according to exemplary aspect 18, wherein the initiation of the carrying out of the calibration comprises an authentication of the user on the radio circuit device.

Exemplary aspect 20 is a method according to any of the exemplary aspects 17 to 19, wherein the determination of calibration parameters comprises receiving a true distance value representing a true distance between the radio circuit device and an external radio transmitter, determining a measured distance value between the radio circuit device and the radio transmitter using radio signals sent and received by means of the radio circuit, and determining a difference between the true distance value and the measured distance value as a calibration parameter.

Exemplary aspect 21 is a method according to exemplary aspect 20, which furthermore comprises initiating a distance determination of the radio circuit in normal operation after the calibration, comprising determining a measured distance value between the radio circuit device and the external radio transmitter using radio signals sent and received by means of the radio circuit, and correcting the measured distance value by means of the determined calibration parameters.

Exemplary aspect 22 is a method according to exemplary aspect 21, which furthermore comprises a protected transmission of the calibration parameters from the protected memory to the radio circuit.

Exemplary aspect 23 is a method according to any of the exemplary aspects 19 to 22, which further comprises determination of additional environmental parameters using the radio signals sent and received during calibration, and assigning the determined environmental parameters to the measured distance value.

Exemplary aspect 24 is a method according to exemplary aspect 23, which further comprises storing the determined environmental parameters in the memory.

Exemplary aspect 25 is a method according to exemplary aspect 21 or 22 and either of the exemplary aspects 23 or 24, which further comprises allowing the correction of the distance value only if the additional environmental parameters determined during the distance determination in normal operation correspond to those additional environmental parameters which were determined during the calibration as environmental parameters for the same measured distance value.

Exemplary aspect 26 is a method according to exemplary aspect 18 or 19, wherein the initiation of the calibration by the user includes providing a true distance value by the user.

Exemplary aspect 27 is a method according to any of the exemplary aspects 20 to 26, which further comprises carrying out a plurality of calibrations for a plurality of different true distances.

Exemplary aspect 28 is a method according to any of the exemplary aspects 17 to 27, wherein the radio circuit communicates by means of radio signals in a frequency range between approximately 3.5 GHZ and approximately 10 GHz.

Exemplary aspect 29 is a method according to any of the exemplary aspects 17 to 28, wherein the radio circuit communicates by means of ultra-wideband communication (UWB communication).

Exemplary aspect 30 is a method according to any of the exemplary aspects 17 to 29, wherein the radio circuit furthermore communicates by means of another communication in addition to the ultra-wideband communication (UWB communication).

Exemplary aspect 31 is a method according to exemplary aspect 30, the radio circuit furthermore communicating according to a standard for UWB radio circuits, optionally according to FiRa Secure UWB Service (SUS) standard.

Exemplary aspect 32 is a method for providing an access-protected function, wherein the method comprises calibrating a radio circuit device according to any of the exemplary aspects 17 to 31 and checking a request for providing the access-protected function, the method being configured to deny the access-protected function as long as no distance determination initiated as part of the normal operation results in a corrected measured distance value within a predefined range of distance values.

Further advantageous configurations of the device are evident from the description of the method, and vice versa.

The invention claimed is:

1. A radio circuit device, comprising:
- a processor;
- a radio circuit; and
- a memory protected using a cryptographic function, wherein the processor is configured to:
- carry out a calibration of a distance determination of the radio circuit, the distance determination configured to determine a distance between the radio circuit device and an external radio transmitter, by determining calibration parameters using the radio circuit, the calibration parameters for correcting measured distance values, and
- store the calibration parameters in the memory.

2. The radio circuit device as claimed in claim 1, wherein the processor is configured to initiate the carrying out of the calibration by a user.

3. The radio circuit device as claimed in claim 2, wherein initiating the calibration by the user includes providing a true distance value by the user.

4. The radio circuit device as claimed in claim 1, wherein the determining calibration parameters comprises:
- receiving a true distance value representing a true distance between the radio circuit device and the external radio transmitter;
- determining a measured distance value between the radio circuit device and the external radio transmitter using radio signals sent and received using the radio circuit; and
- determining a difference between the true distance value and the measured distance value as a calibration parameter.

5. The radio circuit device as claimed in claim 4, wherein the processor is further configured to initiate a distance determination of the radio circuit as part of the normal operation after the calibration, and wherein the radio circuit is configured to determine a measured distance value between the radio circuit device and the external radio transmitter using radio signals sent and received using the radio circuit and to correct the measured distance value using the determined calibration parameters.

6. The radio circuit device as claimed in claim 5, wherein the radio circuit is configured to receive the calibration parameters from the protected memory.

7. The radio circuit device as claimed in claim 5, wherein the processor is further configured to:
- determine additional environmental parameters using the radio signals sent and received during calibration; and
- assign the determined additional environmental parameters to the measured distance value.

8. The radio circuit device as claimed in claim 7, wherein the processor is further configured to allow the correction of the measured distance value only if the additional environmental parameters determined during the distance determination in normal operation correspond to those additional environmental parameters that were determined during the calibration as environmental parameters for the same measured distance value.

9. The radio circuit device as claimed in claim 4, wherein the processor is configured to carry out a plurality of calibrations for a plurality of different true distances.

10. The radio circuit device as claimed in claim 1, wherein the radio circuit is configured for communication using radio signals in a frequency range between approximately 3.5 GHz and approximately 10 GHz.

11. The radio circuit device as claimed in claim 1, wherein the radio circuit is further configured to communicate according to a standard for UWB radio circuits.

12. A method for calibrating a radio circuit device comprising a radio circuit and a cryptographically protected memory, the method comprising:
- carrying out a calibration of a distance determination of the radio circuit, the distance determination configured to determine a distance between the radio circuit device and an external radio transmitter, by determining calibration parameters using the radio circuit, the calibration parameters for correcting measured distance values; and
- storing the calibration parameters in the memory.

13. The method as claimed in claim 12, further comprising:
- initiating the carrying out of the calibration by a user.

14. The method as claimed in claim 12, wherein the determining calibration parameters comprises:
- receiving a true distance value representing a true distance between the radio circuit device and the external radio transmitter;
- determining a measured distance value between the radio circuit device and the external radio transmitter using radio signals sent and received using the radio circuit; and
- determining a difference between the true distance value and the measured distance value as a calibration parameter.

15. The method as claimed in claim 14, further comprising, in a normal operation after the calibration:
- initiating a distance determination of the radio circuit, comprising:
  - determining a measured distance value between the radio circuit device and the external radio transmitter using radio signals sent and received using the radio circuit; and correcting the measured distance value using the determined calibration parameters.

16. The method as claimed in claim 15, further comprising:

protected transmission of the calibration parameters from the protected memory to the radio circuit.

17. The method as claimed in claim 15, further comprising:

determining additional environmental parameters using the radio signals sent and received during the calibration; and assigning the determined additional environmental parameters to the measured distance value.

18. The method as claimed in claim 17, further comprising:

allowing the correction of the distance value only if the additional environmental parameters determined during the distance determination in normal operation correspond to those additional environmental parameters that were determined during the calibration as environmental parameters for the same measured distance value.

* * * * *